United States Patent [19]

Meyer, Jr.

[11] Patent Number: 4,507,870

[45] Date of Patent: Apr. 2, 1985

[54] INDICATOR GAGE ASSEMBLY FOR MEASURING INTERNAL ENLARGEMENTS

[76] Inventor: Franklin Meyer, Jr., P.O. Box 1, Forestdale, R.I. 02824

[21] Appl. No.: 472,068

[22] Filed: Mar. 4, 1983

[51] Int. Cl.³ ............................ G01B 3/26; G01B 5/12
[52] U.S. Cl. ................................. 33/147 K; 33/178 R
[58] Field of Search ............ 33/147 F, 147 K, 178 R, 33/178 B

[56] References Cited

U.S. PATENT DOCUMENTS

| 2,454,246 | 11/1948 | Worthen | 33/178 R |
| 2,679,107 | 5/1954 | Gondek | 33/178 R |
| 2,830,375 | 4/1958 | Zwayer | 33/147 K |
| 3,296,707 | 1/1967 | Eisele | 33/178 R |
| 4,058,901 | 11/1977 | Lendi et al. | 33/178 R |
| 4,067,114 | 1/1978 | Meyer, Jr. | 33/178 R |
| 4,288,924 | 9/1981 | Mizuno et al. | 33/147 K |

FOREIGN PATENT DOCUMENTS 255214  1/1913  Fed. Rep. of Germany .... 33/178 R
1147728  4/1969  United Kingdom ............ 33/147 K Primary Examiner—Richard R. Stearns
Attorney, Agent, or Firm—Maurice R. Boiteau

[57] ABSTRACT

The gage assembly of the present application includes a gage head detachably mountable on an amplifying and indicating mechanism for providing a graduated indication of any deviation in the size of an internal enlargement or groove in a bore in a workpiece. The gage head includes a pair of opposed radially slidable blades urged outwardly by a spring force exerted on a tapered plunger by a spring forming a part of the amplifying and indicating mechanism. The outward extension of the blades, which are sized and shaped to enter the groove in the workpiece, is coupled to the amplifying and indicating mechanism by the axial displacement of the plunger and displayed on an indicator dial forming a part of the mechanism. The gage head is centralized in the bore by a pilot adjacent the blades, which aligns the head with the axis of the bore.

11 Claims, 7 Drawing Figures

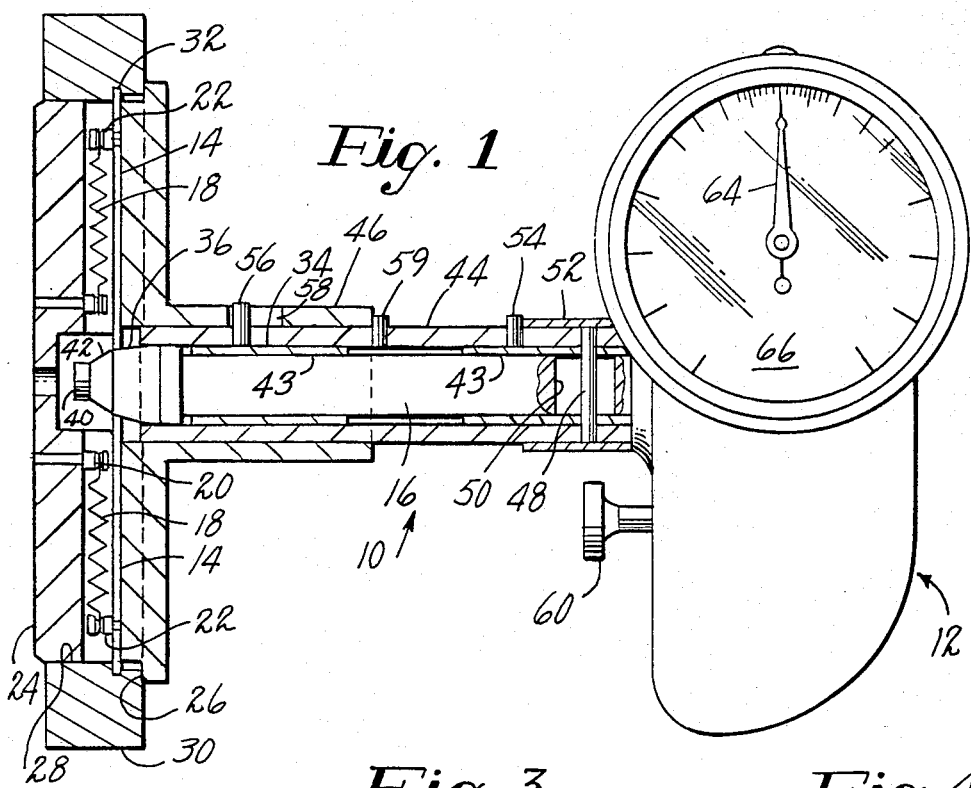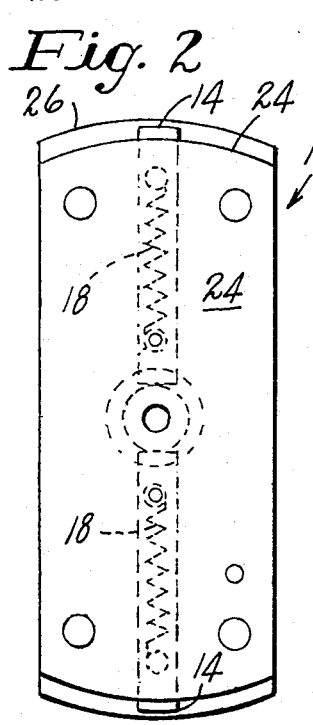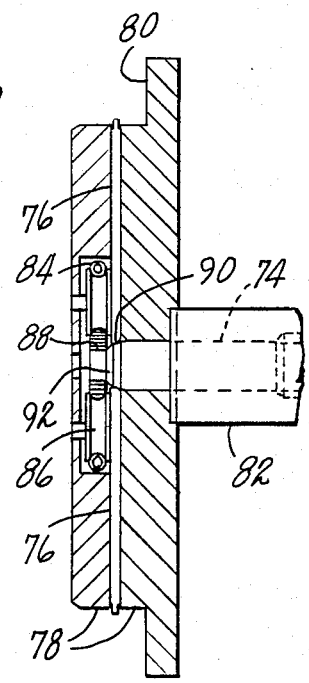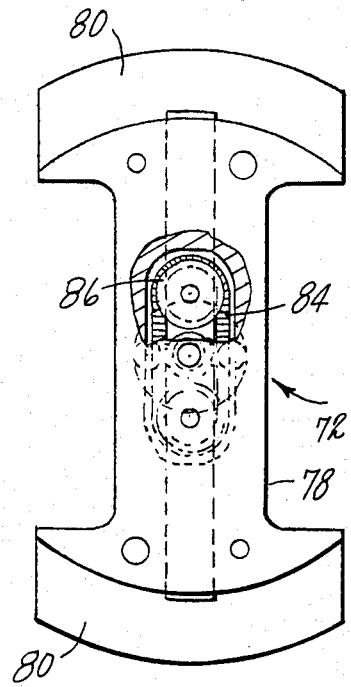

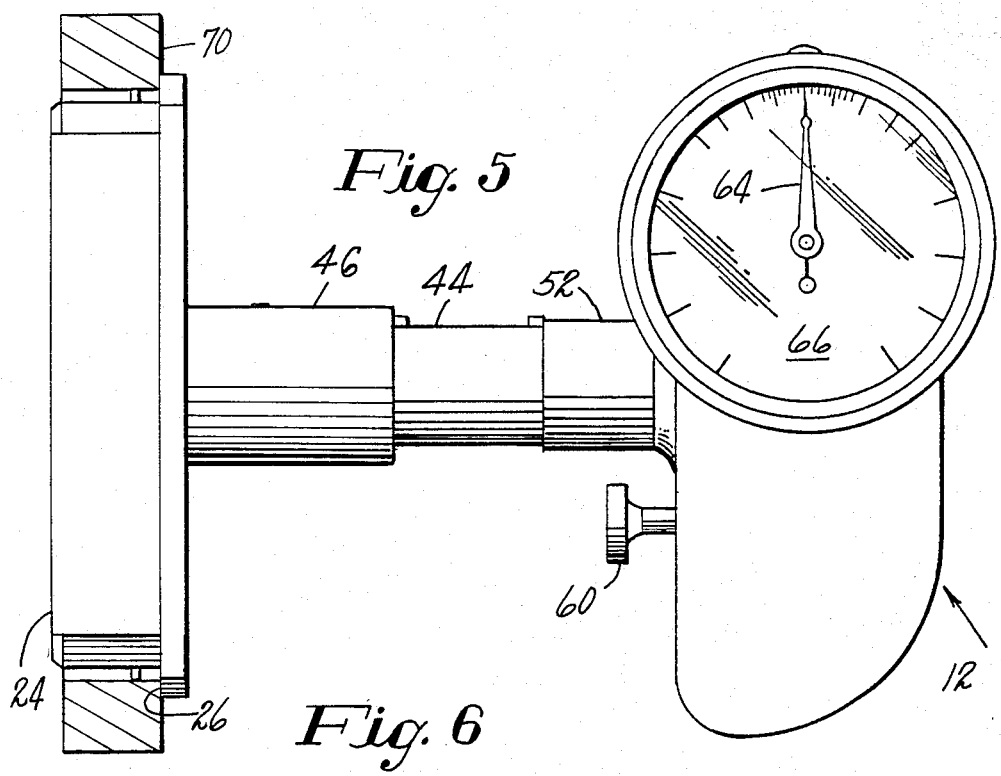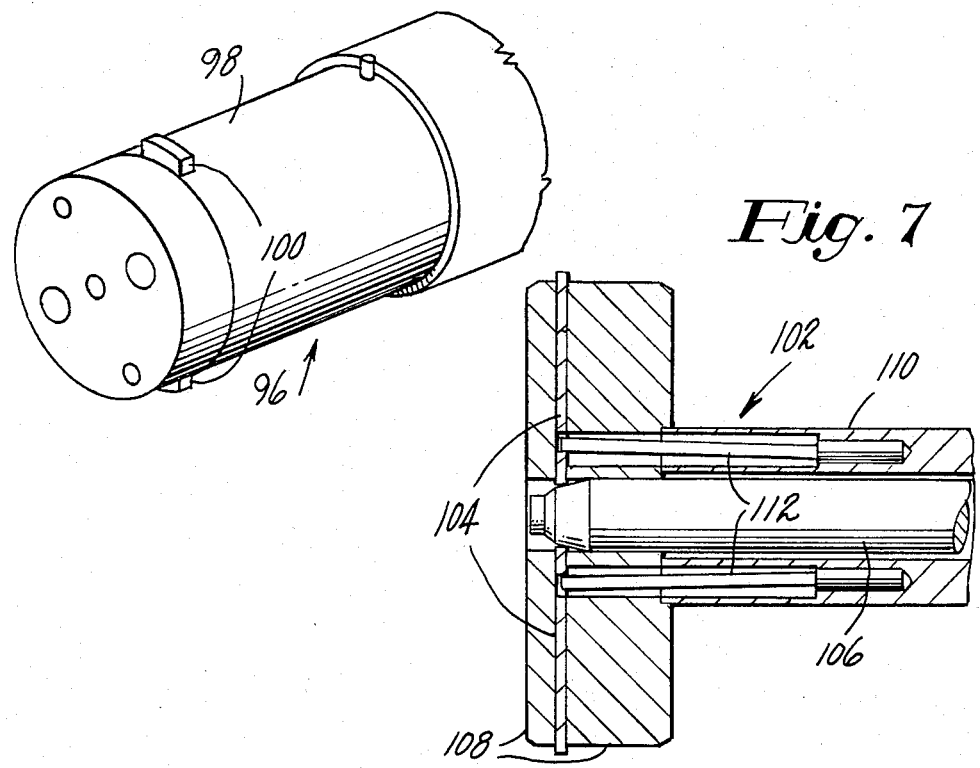

INDICATOR GAGE ASSEMBLY FOR MEASURING INTERNAL ENLARGEMENTS

The present application relates generally to gage assemblies for the precise measurement of internal enlargements such as grooves in workpieces or parts being manufactured, usually in large numbers, and more particularly to such assemblies which may be employed for indicating, on a graduated dial, deviations from the basic size of the enlargement.

The design of numerous different parts which are manufactured in large quantities frequently includes bores formed with internal grooves or other enlargements having a diameter greater than that of the bore. In the interest of clarity and simplicity of expression, all grooves and enlargements will be referred to simply as grooves in this specification and the word groove will be understood to mean any enlargement in internal bore diameter, greater than the adjacent bore area and/or end of the bore, requiring an expanding and collapsing gage for its measurement. A typical, though far from exclusive or even unusual such design is one in which a groove is machined in a bore for receiving an internal snap ring. It is generally required that the diameter of such snap ring grooves be controlled within relatively close limits and further that a proportional indication of size rather than a "go—not go" measurement, be reliably obtainable with applicable measuring instrumentalities. It is further generally required that the measurement be obtained quickly on large numbers of workpieces by persons of limited skill in the use of measuring equipment. Because of the normally expected low level of skill in the use of measuring instruments and the production environment in which the equipment is to be used, it is preferable if not absolutely necessary that gage assemblies for measuring enlargements such as grooves be sufficiently sturdy to resist being damaged.

Heretofore, snap ring grooves and other enlargements have typically been measured, whenever an indication of size within the tolerance band was required, by a gage such as a swing arm groove diameter indicator gage or an indicator gage of generally similar construction featuring parallel movement of measuring members. In either case, the use of these gages tends to be unsatisfactory for a number of reasons. A primary difficulty with such conventional gages is the skill and time required for obtaining measurements which are partly subjective and which leave something to be desired in their accuracy and reliability. The reason for the lack of reliability in measuremets obtained with conventional gages is that it is difficult to align such gages in an axial plane to obtain the correct measurement. It is necessary that the gage be rocked from side to side to obtain the maximum value. This necessary procedure in using conventional groove gages is both time consuming and leads to a subjective interpretation of the correct measurement. Additionally, the use of such conventional gages requires a certain degree of skill on the part of the user if discrepancies in readings are to be avoided. Another shortcoming of such conventional groove gages is their lightweight generally flimsy construction, which makes such gages ill-suited to resist the frequently rough handling in a production environment.

It is accordingly a general object of the present invention to improve the reliability of gaging of internal grooves.

Another object is to avoid inherent weaknesses of conventional groove gages which render them subject to damage by rough handling.

A more particular object is to reduce the degree of skill required of the user of groove gages in obtaining accurate and reliable measurements independently of subjective judgment.

In the achievement of the foregoing objects, a feature of the invention relates to a gage head sub-assembly which is detachably mountable on a conventional amplifying and indicating mechanism. The gage head includes a pair of opposed retractable blades urged radially outwardly by a spring pressed tapered plunger to enter the groove to be measured, once the gage body has been introduced into the bore. The spring pressure is supplied by the amplifying and indicating mechanism to the plunger which couples the position of the blades to a pointer which indicates any deviation from the basic dimension on a graduated dial.

According to another feature, the gage head includes a pilot which fits the bore into which the groove is cut and thus aligns the gage head with the axis of the bore before the blades are permitted to enter the groove. In addition, in gage heads for a single groove at a fixed distance from an outer end of a bore, the gage head is provided with a shoulder for positioning the blades axially in line with the groove. The provisions for easily positioning the gage head coaxially with the bore and along the axis in line with the groove, greatly facilitates the taking of measurements and essentially eliminates the need that the user feel the high point or maximum reading as in using conventional groove gages which resemble internal calipers and include no additional positioning means.

The foregoing objects and features of the present invention will be clarified and numerous advantages inherent in its use will be more fully understood from the following detailed description of an illustrative embodiment taken in connection with the accompanying drawings in which:

FIG. 1 is a view in side elevation and partly in cross section of a gage head according to the present invention, mounted on a conventional amplifying and indicating mechanism, the assembly being shown in the process of measuring the diameter of a relatively deep groove in a workpiece;

FIG. 2 is a view in end elevation of the gage head of FIG. 1;

FIG. 3 is a fragmentary detail view in side elevation and partly in cross section of an alternative and simpler gage head construction applicable to the measurement of shallower grooves than the gage head depicted in FIGS. 1 and 2;

FIG. 4 is a view in end elevation of the gage head of FIG. 3;

FIG. 5 is a view in side elevation of the gage assembly of FIG. 1, being adjusted or calibrated using a master ring;

FIG. 6 is a view in perspective showing an alternative construction of groove gage according to the present invention, applicable to the measurement of two or more grooves which are spaced apart in the same relatively small bore; and FIG. 7 is a fragmentary detail view in longitudinal cross section showing an alternative form of retracting springs for groove measuring blades in gage heads.

Turning now to the drawings, particularly FIGS. 1 and 2, there is shown a gage assembly comprising a gaging head indicated generally at 10, mounted on an amplifying and indicating mechanism indicated generally at 12. The head 10 includes a pair of opposed blades 14 urged radially outwardly by a spring pressed plunger 16 and retracted, each by a tension spring 18 stretched between a stationary anchor pin 20 and another similar pin 22. The anchor pins 20 are pressed in appropriate openings in a pilot 24 while the pins 22 are similarly secured to the blades 14, whose outer or groove contacting ends are ground to a cylindrical shape. The pilot 24 is formed with an integral flange 26 and sized to fit closely into a bore 28 in a workpiece or part 30 and thus align the gage head 10 with the axis of the bore while the flange 26, by abutting the end of the workpiece, aligns the blades 14 to enter a groove 32 whose diameter is to be measured. As seen in FIG. 2, the pilot 24 consists of two parts screwed and doweled together to retain the relative positioning of the parts and to provide an internal guideway in which the blades 14 are slidable and a space in which the springs 18 are enclosed.

The plunger 16 performs the functions of urging the blades 14 radially outwardly against the force of the springs 18, of partially amplifying their motion and of relaying it to the amplifying and indicating mechanism 12. The coupling of the plunger 16 to the mechanism 12 is accomplished by a crosshead such as that shown in U.S. Pat. No. 1,652,854 granted Dec. 13, 1927, upon application of Philip J. Darlington, which discloses the amplifying and indicating mechanism. The left or outer end of the plunger 16 is formed with a tapered tip including an amplifying or working taper 36 which engages the blades 14 while they are in their measuring range. The extreme tip of the plunger is formed with a reduced diameter 40, which when withdrawn into the plane of the blades 14 allows the blades to be retracted out of the groove 32 so that the gage head may be engaged in and disengaged from the workpiece 30. The plunger is bevelled at 42 between the diameter 40 and the working taper 36 to assist in urging the blades into groove measuring positions.

In the embodiment of the invention depicted in FIGS. 1 and 2, the plunger 16 is slidably supported and arranged to allow a substantially greater radial displacement of the blades 14 than is provided for in other embodiments to be described in connection with other views. For this purpose, the radial distance between the working taper 36 and the reduced diameter 40 is greater than otherwise necessary in measuring shallower grooves and the plunger 16 is accordingly of a larger diameter. The mounting of the plunger 16 is also arranged to permit it to move in a compound axial motion. This is accomplished by mounting the plunger 16 for sliding motion in spaced apart bronze bushings 43 pressed in a sleeve 44 which is in turn slidable in a hollow shank 46. The plunger 16 is captively retained in the sleeve 44 by a pin 48 which passes through a slot 50 in the plunger. The pin 48 is a slip fit in the sleeve 44 and is retained by a locating sleeve 52, which is mounted around the sleeve 44 where it is located by a pin 54 and serves to position the gage head 10 in the mechanism 12. The sleeve 44 is in turn held captive in the shank 46, which together with the pilot 24 forms the body of the head 10, by a retaining pin 56 pressed into an opening in the sleeve 44 and passing loosely through a slot 58 in the shank 46. Forward movement of the sleeve 44, to the left, is limited by a pin 59 which is pressed into the sleeve and abuts the end of the shank 46 at the forward end of the motion of the sleeve.

It will thus be seen that in the operation of the gage head 10, the plunger 16 is first retracted so that the blades 14 are aligned with the reduced diameter 40 and thus drawn into the body by the springs 18. The displacement of the plunger 16 with respect to the blades 14 is accomplished partly by a motion imparted to it by depressing a control button 60, which performs its conventional function of retracting the plunger in the mechanism 12. The remainder of the displacement is provided by a rightward motion of the sleeve 44 in the shank 46. With the plunger displaced so that the diameter 40 is in line with the blades 14, the head is inserted into the bore 28 in the workpiece and the plunger 16 advanced to the left by a combination of releasing the button 60 and advancing the sleeve 44 until the pin 59 abuts the end of the shank 46. In this position of the plunger 16, the blades 14 are engaged by the working taper 36 which urges them outwardly to enter the groove 32 under the spring force supplied to the plunger by the mechanism 12. The outward extension of the blades 14, whose outer or part contacting ends are ground to a radius somewhat less than that corresponding to the minimum diameter of the groove being measured, is amplified by the taper 36 and communicated by the plunger 16 to the mechanism 12 for display by a pointer 64 on a dial 66 forming a part of the mechanism. Withdrawal of the gage head from the workpiece is by reversal of the motions required for insertion. The button 60 is depressed and the sleeve 44 is moved to the right with respect to the body 24, 46. causing the reduced diameter 40 to become aligned with the blades 14 and permitting them to be drawn inwardly by the springs 18 so that the gage head may be removed from the workpiece.

The gage assembly comprising the head 10 and the mechanism 12 is calibrated by inserting the head including the blades 14 into a master ring gage 70 as seen in FIG. 5. The adjustment consists merely of rotating the dial so that the pointer indicates zero while the blades 14 are in engagement with the interior of the master ring 70. The procedure is simple and is therefore repeated at planned intervals or when otherwise considered desirable to verify the setting of the dial and the consequent calibration of the gage assembly against a known standard.

The gage assembly indicated generally at 72 and depicted in FIGS. 3 and 4 is comparable to that of FIGS. 1 and 2 in operating principle but, being intended for measuring shallower grooves, is of a simpler construction, particularly in the mounting and degree of motion of a plunger 74 which is axially slidable and acts upon a pair of opposed laterally extendable blades 76. The head 72 is detachably mountable on an amplifying and indicating mechanism such as that indicated at 12 in FIGS. 1 and 5 in the same manner as the head 10 and is also calibrated by the same procedure as the assembly 10, 12 using an appropriate master ring gage. The head 72 includes a composite body comprising a two part pilot 78, the parts of which are screwed and dowelled together and provide a guideway for the blades 76. The pilot is formed with flared workpiece engaging surfaces including integral flanges 80 having the same function as the flange 26 of the head 10, seen in FIG. 1. The pilot 78 is secured by screws and dowels, not shown, to a stem 82 in which the plunger 74 is slidable and there is contained within a cavity in the pilot a garter spring 84, looped around spools 86 fixed to the outer surface of the blades 76, for urging the two blades toward each other in the absence of an outwardly directed force exerted by the plunger 74 while the blades are in engagement with a groove whose diameter is being measured. The plunger 74 is formed at its distal end with a reduced diameter 88 providing the necessary clearance to permit the blades 76 to be retracted out of engagement with the groove being measured. The blades 76 are shown in FIG. 3 in engagement with a working or amplifying taper 90, which translates the outward extension of the blades into an axial position of the plunger to be interpreted by a mechanism such as that shown at in FIGS. 1 and 5. Additionally, the tip of the plunger 74 is also formed with an intermediate, relatively steep bevel 92, which assists in urging the blades 76 outwardly from contact with the diameter 88 to engagement with the working taper 90. It will be noted that the blades 76, which are ground cylindrical at their outer ends, are also thinned at their outer end portions, an expedient employed to permit entry of the blades into narrow grooves while retaining sufficient size through most of their lengths to withstand applicable forces and wear. Additionally, the plunger contacting ends of the blades 76 are shown in FIG. 2 as bevelled to match the angle of the working taper 90 and may additionally be ground to a conical contour rather than flat as shown in FIGS. 1 and 2 for the inner tips of the blades 14. The shape of the inner ends of the blades to conform to the working taper of the plunger is useful for reducing the rate of wear of their plunger-engaging surfaces.

In construction and use of the gage head 72, except as already indicated, is the same as the described in conjunction with the assembly 10, 12. The head 72 is employed with an amplifying and indicating mechanism like that indicated at 12. One difference in usage, however, is that, because of a shallower groove to be measured, the compound motion of the plunger is unnecessary. In the case of the head 72, the simple retracting of the plunger 74 by means of the control button 60 on the mechanism 12 is sufficient to permit the blades 76 to be withdrawn from the groove so that the gage head may be inserted into and removed from the related workpiece. In the same manner as the head 10, the head 72 is also calibrated at regular intervals by adjusting the orientation of the indicator dial while the blades engage the interior of an appropriate master ring gage, not shown.

There is in FIG. 6, a fragmentary showing of portion of a gage head indicated generally at 96, for measuring the diameter of grooves in bores of substantially lesser diameters than those for which the gage heads 10 and 72 are intended. The gage head 96 includes a composite body 98 which provides an unrelieved, fully cylindrical pilot for insertion into the bore of the related workpiece and a pair of outwarly extending blades 100, urged outwardly by an internally slidable plunger comparable to the plunger 74 but of reduced diameter to adapt to the more restricted environment. It will be noted that the body does not include a flange for limiting the insertion of the body into a workpiece. The gage head 96 may accordingly be used for measuring the diameter of a plurality of axially spaced apart grooves in the same workpiece.

A gage head indicated generally at 102, shown in FIG. 7 includes a pair of opposed blades 104 coupled to a plunger 106 having a distal end generally similar to that of plunger 74. The blades 104 are slidable radially in a pilot 108 forming a part of a composite body also including, in addition to the two part pilot, a stem 110 in which the plunger is slidable and which is screwed and dowelled to the pilot in much the same manner as the stem 82 to the pilot 78. The head 102 includes a pair of leaf springs, each coupled at its distal end to one of the blades by entering a suitable opening in the blade and having it other end pressed into an opening in the stem 110.

It has also been found that by employing blades of somewhat greater thickness in the construction depicted in FIG. 7, such an arrangement is suitable for providing a gage for measuring diameters of bores as well as of grooves, particularly under circumstances, such as passing through a portion of an interrupted bore, in which a conventional split expanding plug of the general type disclosed in the above-identified Darlington patent, is vulnerable to premature breakage from being slammed into the interrupted workpiece during withdrawal of the gage head. In addition, the leaf springs 112 have been useful for incorporation in the design of gages for bores in which the groove to be measured is located in close proximity to a bottom wall of a blind bore, or where a relatively high spring rate is necessary in a relatively small volume.

From the foregoing description of illustrative embodiments, many variations within the scope and spirit of the invention will obvious immediately to those of ordinary skill in the art. It will also become apparent that some of the elements and features may be employed while omitting others to achieve the overall advantages of the present invention in certain circumstances. It is accordingly not intended that the foregoing description and drawings be taken in a limiting sense but rather that the scope of the invention be interpreted in terms of the appended claims.

Having thus disclosed my invention, what I claim as new and desire to secure by Letters Patent of the United States is:

1. A gage assembly for measuring the diameter of an internal enlargement of a bore in a workpiece comprising an amplifying and indicating mechanism including a display upon which deviations from basic size are indicated, and also comprising a gage head insertable into the bore and including a pilot adapted to fit the bore closely adjacent the enlargement, a pair of radially slidable blades and means including an axially slidable plunger coupling the blades to the mechanism for indication of deviations on the display and the plunger being formed with a working taper for translating the radial movement of the blades into an axial movement of the plunger, a reduced diameter in engagement with the inner ends of the blades when the blades are retracted within the pilot for insertion of the pilot into and withdrawal from the bore while the inner ends of the blades remain in contact with the plunger and means for urging the blades outwardly to enter the enlargement after the pilot has been inserted into the bore including a tapered portion on the plunger between the reduced diameter and the working taper having a steeper taper angle than that of the working taper.

2. A gage assembly according to claim 1 further characterized in that the plunger is coupled at one end to the amplifying and indicating mechanism and its opposite end portion is in engagement with the inner ends of the blades for urging them outwardly into the enlargement.

3. A gage assembly according to claim 2 further characterized in that the mechanism includes spring means applying axial pressure to the plunger and means for withdrawing the working taper of the plunger out of engagement with the blades.

4. A gage assembly according to claim 2 further comprising an elongated hollow shank on the pilot, a sleeve in which the plunger is axially slidable and which is in turn slidable in the hollow shank.

5. A gage assembly according to claim 2 further comprising spring means urging the blades into the interior of the pilot while the reduced diameter is in alignment with the blades.

6. A gage assembly according to claim 1 further comprising a flange on the pilot adapted to limit the entry of the pilot into the bore to position the blades in the plane of the enlargement to be measured.

7. A gage head adapted to be coupled to an amplifying and indicating device for measuring the diameter of an enlargement in a bore in a workpiece, comprising a body including a cylindrical pilot portion adapted to fit closely into the bore and an elongated hollow shank, a pair of blades mounted in the body for opposite radial sliding motion, a plunger axially slidable in the shank and having one end adapted for releasable coupling to the device and its opposite end portion engaging the inner ends of the blades including a working taper engaging the blades and urging them into the enlargement, a reduced diameter allowing retraction of the blades from the enlargement when the reduced diameter is aligned with the inner ends of the blades and a tapered portion between the reduced diameter and the working taper having a steeper taper angle than the working taper.

8. A gage head according to claim 7 further comprising spring means connected to the blades for urging them radially inwardly against the plunger and into engagement with the reduced diameter when the plunger is retracted.

9. A gage head according to claim 7 further characterized in that the plunger is in engagement with the blades thereby extending the blades outwardly when the working taper engages the inner ends of the blades.

10. A gage head according to claim 7 further comprising a flange on the pilot adapted to limit the entry of the pilot into the bore to position the blades in the plane of the enlargement to be measured.

11. A gage head adapted to being detachably coupled to an amplifying and indicating mechanism including a dial on which a deviation from a basic diameter is indicated by a pointer, for providing a graduated measurement of the diameter of a bore between upper and lower limits, the head comprising a body including a pilot having an axis and being sized to fit closely into a bore having a diameter at the lower limit, a pair of blades radially slidable in the pilot and cylindrically contoured about the axis at their outer ends, the body also including a hollow shank, the head further comprising a plunger axially slidable in the shank and having one end adapted to being coupled to and to be axially spring pressed by the mechanism and its opposite end formed with a working taper engaging the inner ends of the blades to urge them outwardly into engagement with the wall of the bore, thereby partly amplifying and communicating the outward displacement of the blades and consequent measured diameter of the bore to the mechanism, the opposite end being also formed with a reduced diameter in engagement with the inner ends of the blades for permitting the head to be withdrawn from the workpiece and a tapered portion between the reduced diameter and the working taper having a steeper taper angle than that of the working taper.

* * * * *